(12) United States Patent
Storlie et al.

(10) Patent No.: US 10,269,376 B1
(45) Date of Patent: Apr. 23, 2019

(54) DESIRED SIGNAL SPOTTING IN NOISY, FLAWED ENVIRONMENTS

(71) Applicant: Invoca, Inc., Santa Barbara, CA (US)

(72) Inventors: Sean Michael Storlie, Santa Barbara, CA (US); Victor Jara Borda, Santa Barbara, CA (US); Michael Kingsley McCourt, Jr., Santa Barbara, CA (US); Leland W. Kirchhoff, Santa Barbara, CA (US); Colin Denison Kelley, Santa Barbara, CA (US); Nicholas James Burwell, Santa Barbara, CA (US)

(73) Assignee: Invoca, Inc., Santa Barbara, CA (US)

( * ) Notice: Subject to any disclaimer, the term of this patent is extended or adjusted under 35 U.S.C. 154(b) by 0 days.

(21) Appl. No.: 16/022,370

(22) Filed: Jun. 28, 2018

(51) Int. Cl.
| | |
|---|---|
| *G10L 15/08* | (2006.01) |
| *H04M 3/18* | (2006.01) |
| *H04M 3/22* | (2006.01) |
| *H04M 3/54* | (2006.01) |
| *G10L 25/84* | (2013.01) |

(52) U.S. Cl.
CPC .............. *G10L 25/84* (2013.01); *G10L 15/08* (2013.01); *H04M 3/18* (2013.01); *H04M 3/22* (2013.01); *H04M 3/54* (2013.01); *G10L 2015/088* (2013.01)

(58) Field of Classification Search
None
See application file for complete search history.

(56) References Cited

U.S. PATENT DOCUMENTS

| | | | | |
|---|---|---|---|---|
| 6,513,005 | B1* | 1/2003 | Qin | G06K 9/6293 704/231 |
| 6,961,704 | B1* | 11/2005 | Phillips | G10L 13/10 704/267 |
| 8,494,853 | B1* | 7/2013 | Mengibar | G10L 15/065 704/235 |
| 9,875,740 | B1* | 1/2018 | Kumar | G10L 15/30 |
| 2001/0018653 | A1* | 8/2001 | Wutte | G06F 17/24 704/256.1 |
| 2003/0061043 | A1* | 3/2003 | Gschwendtner | G10L 15/08 704/254 |
| 2004/0215455 | A1* | 10/2004 | Kemp | G10L 15/22 704/235 |
| 2005/0267735 | A1* | 12/2005 | Kharrat | G06F 17/274 704/4 |

(Continued)

*Primary Examiner* — Thuykhanh Le
(74) *Attorney, Agent, or Firm* — SoCal IP Law Group LLP; Angelo Gaz; Steven Sereboff

(57) ABSTRACT

There are disclosed devices, system and methods for desired signal spotting in noisy, flawed environments by identifying a signal to be spotted, identifying a target confidence level, and then passing a pool of cabined arrays through a comparator to detect the identified signal, wherein the cabined arrays are derived from respective distinct environments. The arrays may include plural converted samples, each converted sample include a product of a conversion of a respective original sample, the conversion including filtering noise and transforming the original sample from a first form to a second form. Detecting may include measuring a confidence of the presence of the identified signal in each of plural converted samples using correlation of the identified signal to bodies of known matching samples. If the confidence for a given converted sample satisfies the target confidence level, the given sample is flagged.

14 Claims, 4 Drawing Sheets

(56) References Cited

U.S. PATENT DOCUMENTS

| | | | |
|---|---|---|---|
| 2006/0190253 A1* | 8/2006 | Hakkani-Tur | G10L 15/063 704/243 |
| 2007/0106494 A1* | 5/2007 | Detlef | G06F 17/273 704/9 |
| 2008/0052073 A1* | 2/2008 | Goto | G10L 15/06 704/251 |
| 2009/0228499 A1* | 9/2009 | Schmidtler | G06N 20/00 |
| 2009/0306981 A1* | 12/2009 | Cromack | G10L 15/26 704/235 |
| 2010/0100385 A1* | 4/2010 | Davis | G10L 13/00 704/260 |
| 2010/0100560 A1* | 4/2010 | Bystrov | G06F 19/321 707/769 |
| 2011/0188718 A1* | 8/2011 | Hill | G16H 30/20 382/128 |
| 2011/0298802 A1* | 12/2011 | Whitaker | G06T 17/20 345/423 |
| 2012/0232904 A1* | 9/2012 | Zhu | G10L 15/22 704/254 |
| 2012/0253783 A1* | 10/2012 | Castelli | G06F 17/2818 704/3 |
| 2012/0284081 A1* | 11/2012 | Cheng | G06Q 30/02 705/7.29 |
| 2012/0323897 A1* | 12/2012 | Daher | G06F 16/433 707/723 |
| 2013/0030804 A1* | 1/2013 | Zavaliagkos | G10L 15/26 704/235 |
| 2013/0046531 A1* | 2/2013 | Chandramouli | G06F 17/2715 704/9 |
| 2013/0241834 A1* | 9/2013 | Vennelakanti | G06F 3/017 345/158 |
| 2014/0188475 A1* | 7/2014 | Lev-Tov | G06F 17/30389 704/254 |
| 2014/0207457 A1* | 7/2014 | Biatov | G10L 15/063 704/243 |
| 2014/0337028 A1* | 11/2014 | Wang | H04M 1/6075 704/251 |
| 2015/0358796 A1* | 12/2015 | Sarna, II | H04W 4/90 455/404.2 |
| 2016/0205247 A1* | 7/2016 | Elyashiv | H04M 3/4365 379/93.23 |
| 2016/0306758 A1* | 10/2016 | Lu | G06F 3/165 |
| 2017/0178182 A1* | 6/2017 | Kuskey | G06Q 30/0246 |
| 2018/0054507 A1* | 2/2018 | Bentitou | H04W 4/14 |
| 2019/0050716 A1* | 2/2019 | Barkan | G06N 3/0472 |

* cited by examiner

DESIRED SIGNAL SPOTTING IN NOISY, FLAWED ENVIRONMENTS

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to spotting desired signals in noisy, flawed environments.

Description of the Related Art

Marketing automation tools or devices are often used to automatically analyze electronic input signal to determine what and categorize events that occur between marketing channels and customer prospects. The devices may have input filters, synchronizers, comparators, measurers, and output compilers to make these determinations.

There are various marketing channels that can be used to promote goods and services including blogs, social networking, web page visits, search, etc. Coincident with online marketing channel evolution is the emergence of software-based tools that are focused on automating the marketing process within these various channels. This automation includes marketing campaign creation, launch, tracking, and reporting. While early, and generally rudimentary, marketing automation tools were initially developed by a company internally to facilitate marketing of the products they developed, more recently an industry of third party/outsourced marketing automation tools has emerged that provide more sophisticated tools, that may be used in conjunction with certain online marketing channels, and are capable of providing tracking and reporting. Disadvantageously, the conventional marketing automation tools provided by these third-parties are generally limited to the online/Internet medium, have not been able to address the challenges posed by telephony integration, and provide limited or no telephony integration. For example, some marketing automation tools will attempt to determine what customer prospect behaviors, outcomes or intentions occurred during a call. One such automated tool may try to find out whether customer prospects made a purchase by analyzing call information. However, automating such analysis require input of many months of call samples. In many cases, due to the complexity of the analysis, human intervention is still required. What is needed is an improved automated tool for determining what behaviors, outcomes and intentions occurred during a call with a customer prospect.

Figure 1:
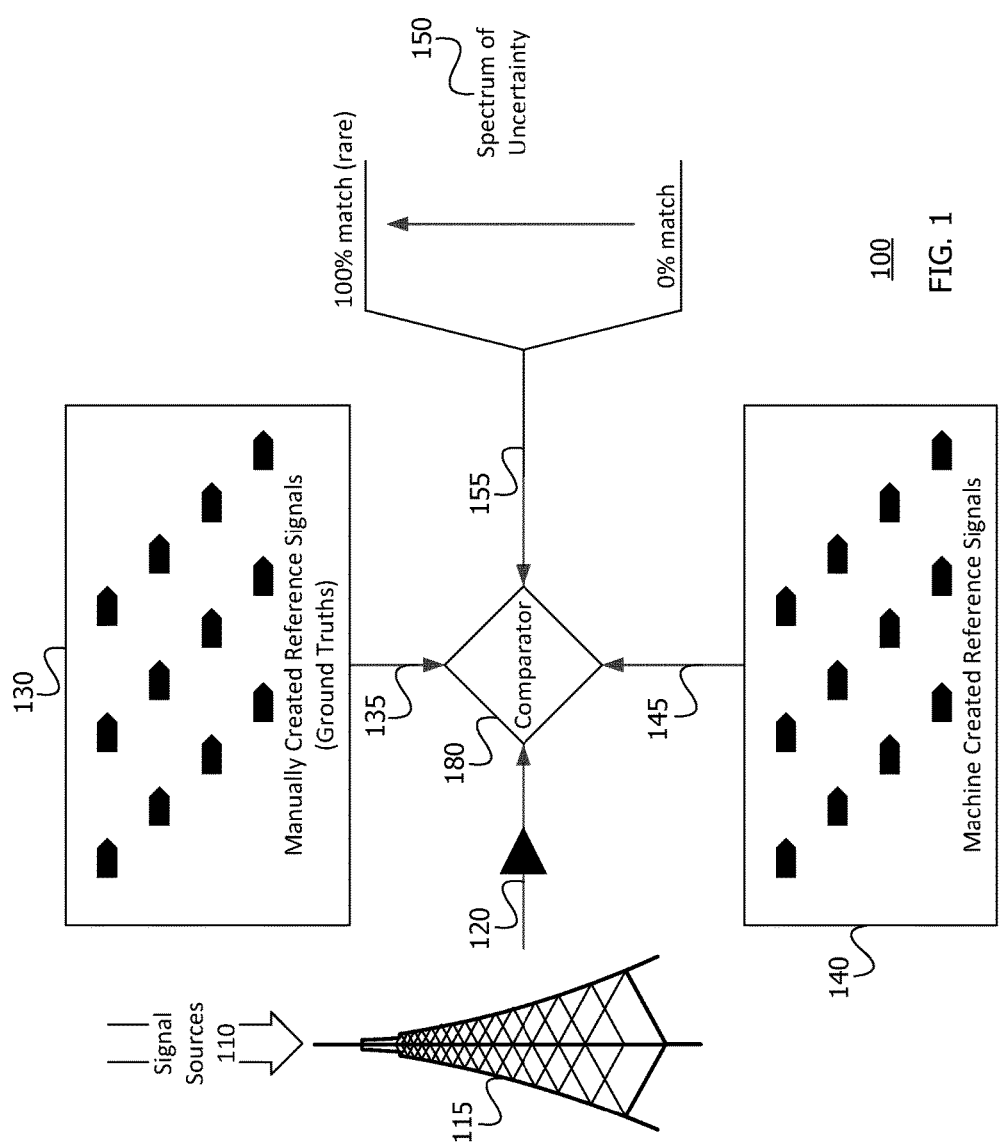
FIG. 1 is a system architecture that includes a comparator for spotting desired signals in noisy, flawed environments.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Although there has been a significant shift in the past decade towards the purchase of goods and services online, there are still a number of products and services purchased over the phone. For example, based on an advertisement, a call may be initiated between a customer prospect and an advertised phone address so that the customer prospect can make the purchase.

Technologies described herein provide an expression builder to automatically determine what behaviors, outcomes or intentions of the customer prospect are occurring or have occurred during the call by looking at call information of the call. For instance, the builder may be a tool or unit that detects or spots certain statements or signals in the call information that identify or evidence the behaviors, outcomes and intentions of the customer prospect. In other words, a certain desired signal can be spotted that identifies that a certain event is happening or has happened in the call. Thus, spotting (e.g., detecting, identifying or recognizing) certain signals in the call may be important to a specific advertiser or marketing campaign. Notably, signals can be spotted in the call to help route the call to a proper sales agent, determine whether a purchase was made, or find out why a customer prospect did not make a purchase.

The expression builder may spot the desired signal by analyzing call information such as metadata, transcript and/or intonation of the call. To spot the desired signal, the call information can be compared with known reference signals using a comparator unit having a trained predictive model. The metadata can contain fields that describe a specific instance of a call, but do not include the content of that call. The metadata can include things like the phone numbers of both parties, locations of the parties, starting time of the call, call duration and other information. The transcript can include a written record, such as an English translation, of the words and possibly sounds uttered by the parties during the call. The intonation can include a written record or identification of the intonations used when the parties uttered words and possibly sounds during the call.

The desired signals may be one or more statements, keywords or phrases that can be found in audio signals, written transcripts and/or audio intonations of a part or segment of a call. Thus, these signals can be identified as desired signals to be spotted in a call to determine whether (and possibly why) a customer prospect did or did not make a purchase. Accurately spotting such desired signals in calls can be an important factor for improving marketing and increasing sales. For instance, "buy" or "purchase" or "don't want" or "no thanks" may identify the behavior, outcome and intention to purchase or not to purchase. In another case, when a customer prospect calls a cellular phone provider, the provider may be interested in spotted the signal "buy" in the call to determine that the customer prospect made a purchase. The provider may also want to spot signals that identify why the customer prospect did not make a purchase so that shortcomings can be remedied to create more sales.

However, it may be difficult to spot such desired signal in noisy and/or flawed environments, such as environments having background audio noise in the call, or that have mislabeled or suspicious reference signals for spotting the desired signal. The noisy, flawed environment may exist in a call with a customer prospect that is currently occurring (e.g., in real time) or has previously occurred. Disclosed herein is a comparator unit that can spot desired signals in such noisy, flawed environments by looking for desired call signal in the call information of the call.

Description of Apparatus

Referring now to FIG. 1, a system 100 architecture having a comparator 180 for spotting desired signals in noisy, flawed environments. The system 100 may be an environment in which the comparator 180 can be trained or used to spot desired signals. The comparator 180 may be a comparator unit that is part of an expression builder unit or tool.

The system 100 has signal sources 110 being received by a receiver antenna 115 which is outputting an original sample of electronic waveform 120 for each of the signal sources 100. The system 100 also has the comparator 180 receiving the original samples 120 from the antenna 115.

The signal sources 110 may be electrical or audio waveforms that include actual or recorded customer prospect speech. The sources 110 may include sound waves of speech, ambient noise and/or speaker outputs that are traveling through the air. The antenna 115 may be a device that converts electrical or audio waveforms of the signal sources 110 into electrical waveforms 120. In one case, the antenna 115 converts audio signals including actual or recorded customer prospect speech into the electronic waveforms 120. Consequently, each of the electronic waveforms 120 may be a stream over time of electrical waveforms converted from actual or recorded customer prospect speech of one of the sources 110 during a phone call. In some cases, the sources 110 and/or the electronic waveforms 120 include electrical or audio noise, such as an amount of noise that makes it difficult to spot desired signals in the signals converted from electronic waveforms 120. In these cases, the sources 110, the resulting electronic waveform 120 and/or signals converted from waveform 120 may be considered a noisy, flawed environment.

The system 100 also has manually created reference signals 130 which output reference signals 135 for each of the electronic waveforms 120 to the comparator 180. In some cases, the manually created reference signals 130 and/or 135 may be ground truth reference signals, such as reference signals selected for or by an advertiser to spot one or more desired signals that are selected for or by the advertiser. Each signal 135 may be one of the signals 130 that corresponds to a desired signal to be spotted.

The signals 130 may be selected (e.g., predetermined or created) from an advertiser's own analytics, customer relationship management (CRM) analytics, and outsourced reviews of old call recordings. For example, the advertiser's own analytics of the electronic waveforms 120 or call information of the electronic waveforms 120 can be used to manually selected the signals 130, such as to spot desired signals. The CRM analytics can be part or all of programming that analyzes data about the advertiser's customers and presents it so that better and quicker business or marketing decisions can be made, such as better selection of the reference signals 130. The outsourced reviews of old call recordings can be performed by third parties such as outside vendors or contractors that provide the service of selecting reference signals for spotting desired signals.

In general, manually created reference signals are good reliable reference signals since they are manually created by or for the advertiser. For example, a cellular phone provider may be interested in spotting the signal "buy" in calls to determine if a purchase was made and will thus create a reference signal 130 that is the written transcript "to buy". Then the comparator 180 can use and/or be trained with that reference signal as the signal 135 "to buy" to spot "buy" in call information of calls from customer prospects.

Next, the system 100 has machine created reference signals 140 which output reference signals 145 for each of the electronic waveforms 120 to the comparator 180. In some cases, the machine created reference signals 140 and/or 145 may be described as AI created reference signals, such as reference signals selected or determined by the system 100 or the comparator 180 to spot one or more desired signals that are selected for or by an advertiser. Each signal 145 may be one of signals 140 that corresponds to a desired signal to be spotted.

The signals 140 may be reference signals selected (e.g., predetermined or created) during training or use of the comparator 180. The signals 140 may be automatically created by or selected by the system 100 and/or the comparator 180 during training to properly identify a desired signal to be spotted in the electronic waveform 120 during use of the comparator. Spotting a desired signal in waveforms 120 may be or include spotting the desired signal in signals converted from and/or call information of waveforms 120.

For example, a furniture seller may be interested in spotting the signal "finance" in calls to determine if a purchase will be financed and the comparator 180 can automatically create a reference signal 140 that is the written transcript "finance agreement" which the predictive model of the comparator knows can be used to spot "finance" in call information of calls. Then the comparator 180 can use and/or be trained with that reference signal as the signal 145 "finance agreement" to spot "finance" in call information of calls from customer prospects.

During training or use, such calls may be anonymized by having any information useable to identify the source of or customer prospect of the call removed. Anonymizing may also include removing any information useable to identify the advertiser, call recipient, call destination or call center of the call removed. Anonymizing may include anonymizing the electronic waveforms 120, call information of the electronic waveforms 120, the signal 130 and the signal 140 prior to or when training the comparator 180.

In some cases, the signals 130, 140, 135 and/or 145 include erroneous signals, such as reference signals that are mislabeled or suspicious. The erroneous signals make it difficult to spot desired signals in the customer prospect speech. In these cases, the signals 130, 140, 135 and/or 145 may be considered a noisy, flawed environment.

In addition, FIG. 1 shows spectrum of uncertainty 150 having uncertainties between 0% match (e.g., no match possible) and 100% match (e.g., certain match). The uncertainty 150 is outputting uncertainty signals 155 for each of the electronic waveforms 120 (e.g., or signals converted from or call information of waveform 120) to the comparator 180. An uncertainty of 100% is rare, while others may be more frequent, such as closer to 50%.

The spectrum 150 may have one uncertainty signal 155 for each desired signal that is to be spotted in the electronic waveforms 120, such as to train or use the comparator 180 to spot desired signals. In some cases, each uncertainty signal 155 is the correlation of a desired signal to be spotted in the electronic waveforms 120, to a reference signal of the signals 130 and/or 140. Identifying of the desired signal to be spotted and setting of the uncertainty may be inputs provided to the comparator during training or use of the comparator. For example, each uncertainty signal 155 from spectrum 150 may be selected or set by a trainer of the comparator 180, an administrator of the system 100 or a designer of the comparator 180. Each may be set per advertiser or marketing campaign.

The comparator 180 may include or be an artificial intelligence (AI) unit such as one having a machine learning engine capable of machine learning to spot desired signals in noisy, flawed environments when trained with training signals or with actual signals. The machine learning engine may include and use a predictive model such as one that is capable of machine learning. Types of predictive learning models for the predictive modeling include linear regression, logistic regression, neural networks, random forest and others. The comparator may be a "unit" including a collection of hardware, firmware, and/or software that is trained to spot desired signals in noisy, flawed environments for a specific advertiser or marketing campaign, such as to target certain customer prospects.

Training and using the comparator to spot desired signals may be performed by inputting signals for calls into the comparator. Each call may be for and include input of one of the electronic waveforms 120 and/or call information for that one of the electronic waveforms 120. Such call information may be call information of a call (e.g., of one of the electronic waveforms 120, see at 260-270 of FIG. 2), a sample of a call (e.g., see at 270-275 of FIG. 2) and/or a sample call of an array (e.g., see at 310 of FIG. 3).

The input signals for each such call may include an electronic waveform 120 and/or call information for the electronic waveform 120; identification of at least one desired signal to be spotted; at least one corresponding reference signal 130 and/or 140 for each desired signal to be spotted; and at least one corresponding signal 155 for each desired signal to be spotted. In one case, input signals for such a call include call information for one of the electronic waveforms 120; identification of one desired signal to be spotted; a reference signal 135 and/or 145 as known samples for the one desired signal to be spotted; and a signal 155 as a target confidence level for the one desired signal to be spotted.

For example, during a real call that uses the comparator 180 in real time to spot a desired signal in the real call, the comparator 180 may receive actual real-time versions of one of the electronic waveforms 120 (or call information of one of waveforms 120); and comparator generated versions of a desired signal to be spotted, the signal 135 and/or 145, and the signal 155.

During a training call used to train the comparator 180 to spot a desired signal in the call, the comparator 180 may receive training input signals or predetermined versions of one of the electronic waveforms 120 (or call information of one of waveforms 120), the desired signal to be spotted, the signal 135 and/or 145, and the signal 155. The comparator 180 may be trained prior to use by inputting training signals for a call into an untrained version of the comparator. The comparator 180 may be further trained during use when actual call signals for a real call are input into the trained version of the comparator.

In some cases, during training or use of the comparator 180, a noisy, flawed environment may exist in the electronic waveform 120, the call information for the electronic waveform 120, the signal 135 and/or the signal 145. As noted above, such a noisy, flawed environment may include or be caused by noise in the sources 110 and/or the electronic waveform 120. In addition, or independently of this noise, a noisy, flawed environment may include errors in the reference signals 135 and/or 145. More specifically, the manually created reference signal 135 and/or the machine created reference signal 145 can be input with call information that includes erroneously created reference signals, such as mislabeled or suspicious reference signals. In some cases, an erroneous reference signal 130 or 140 is created due to noise in the electronic waveform 120 causing an improper identification of the customer prospect behaviors, outcomes or intentions that occurred during the call providing the electronic waveform 120.

The noisy, flawed environment may hinder the comparator's ability to properly spot a desired signal during a call providing the electronic waveform 120. It may cause a comparator to fail to spot the presence of the desired signal. It may make it more difficult for the comparator to spot the desired signals in the call information of the customer prospect's speech. In some cases, it may cause the comparator to misidentify the presence of a desired signal received in the electronic waveform 120. Here the comparator may identify the presence of a non-desired signal as a desired signal.

In order to solve these problems, the comparator 180 may have or use a linear regression model to correct for noise in the electronic waveforms 120 and/or mislabeled or suspicious (e.g., ground truth) reference signals, such as in the signal 130 or 135. The model may be trained and used as explained for the comparator 180. In this case, the comparator 180 may be able to perform weighting analysis of whether a manually created reference signal 130 or 135 is erroneous. For example, based on signal inputs when it is being trained, the comparator 180 may look at the electronic waveform input 120 or call information of electronic waveform 120 of a call during use and spot desired signals even when the electronic waveform 120 includes noise and/or a manually created reference signal is erroneous.

Technologies described herein apply to training the comparator 180, during training or use, to properly spot a desired signal in a noisy, flawed environment. Technologies described herein also apply to using the comparator to spot a desired signal in a noisy, flawed environment during use, such as during a live call from a customer prospect. In either case, comparator 180 may be or have been trained for a specific advertiser or marketing campaign from which the call and signal samples are obtained.

More specifically, during training of the comparator 180, the manually created reference signal 135 and/or the machine created reference signal 145 can be input with reference call information that can be used by the comparator to properly identify the presence of a desired signal in the electronic waveform 120 in a noisy, flawed environment. For example, the reference call information can include one or more of metadata, a transcript and/or an intonation that is included in the signal or call information from a conversion of the electronic waveform 120; and that properly determines the customer prospect's behaviors, outcomes or intentions that occurred during the call.

In some cases, during training of the comparator 180, a manually created reference signal 135 input to the comparator 180 is an erroneous reference signal or includes erroneous reference signals. Here, the reference signal 135 can create a noisy, flawed environment. An example of this is further explained at the correction 370 of FIG. 3.

In this case, the machine created reference signal 145 input to the comparator 180 can be or include call information that can be used to identify the presence of a desired signal received at the electronic waveform 120 to be spotted in the noisy, flawed environment. For example, the reference signal 140 or 145 can include call information allows the model of the comparator 180 to accurately perform a model weighting that determines that the reference signal 130 or 135 is erroneous. Here, the reference signal 140 or 145 can include call information that is or identifies a desired signal to be spotted in the environment. For example, in these cases, the reference signal 140 or 145 properly identifies the customer prospect behaviors, outcomes or intentions that occurred during the call providing the electronic waveform 120 even in a noisy, flawed environment. Consequently, the comparator 180 can use the signal 145 to correct for noise in the electronic waveform 120 and/or the erroneous signal 135, thus training the model to properly identify the desired signal and the customer prospect behaviors, outcomes or intentions.

In other cases, during training of the comparator 180, a machine created reference signal 145 input to the comparator 180 is an erroneous reference signal or includes erroneous reference signals. Here, the reference signal 145 can create a noisy, flawed environment. An example of this is also further explained at the correction 370 of FIG. 3, where such an erroneous reference signal may be replaced.

Herein, an electronic waveform may be an electronic signal that has the speech or words of a telephone call conversation between a customer prospect and an interactive voice response (IVR) system, call center and/or call agent. In some cases, it may be an electronic signal that can be input filtered to remove noise. An electronic waveform may be converted from a recording, a waveform stored in a memory (and optionally converted, such as MPEG 4), and/or by antenna 115. An electronic waveform may describe an original sample, first form, stored sample and/or cabined array call sample.

In some cases, call information may be or include the metadata, text conversion, text transcript and/or intonation of an electronic signal that has the speech or words of such a telephone call conversation.

A signal is text of one or more terms or words. In some cases, it may be the text of the speech or words of a telephone call conversation between a customer prospect and an interactive voice response (IVR) system, call center and/or call agent. It can be the typed-out text and/or electronic identification (e.g., American Standard Code for Information Interchange—ASC II code) of the letters of the terms or words. It can be terms or words that the electronic signal is transformed into such as a text transcription of the speech or words in an electronic waveform. A signal may describe an identified signal, desired signal, converted sample, second form, stored sample, known matching sample, reference signal, manually selected sample, and/or sample selected by a computer.

A signal can be a transformed text that has been anonymized or filtered to remove information identifying a source of the electronic waveform or the signal. A signal can be a synchronized signal that has been synchronized with other signals to test samples. A signal can be a compared signal that has been compared (e.g., tested, measured and/or correlated) to other signals. A signal can be an output signal that is output after filtering and/or conversion. A signal can be a likely matched signal that has a measured confidence that satisfies a target confidence. A signal can be a flagged signal that has been flagged as a likely match. A signal can be a spotted signal that is a flagged signal. A signal can be a stored signal that is stored in a memory.

A confidence is a percentage, scale or spectrum of certainty or uncertainty. A confidence is a spectrum of whether two signals match, such as between 0 percent match when there is no match between the signals, and 100 percent when the signals match perfectly such as when each part of one signal over a range of time is the exact same as each part of the other signal over the range of time.

Description of Processes

Figure 2:
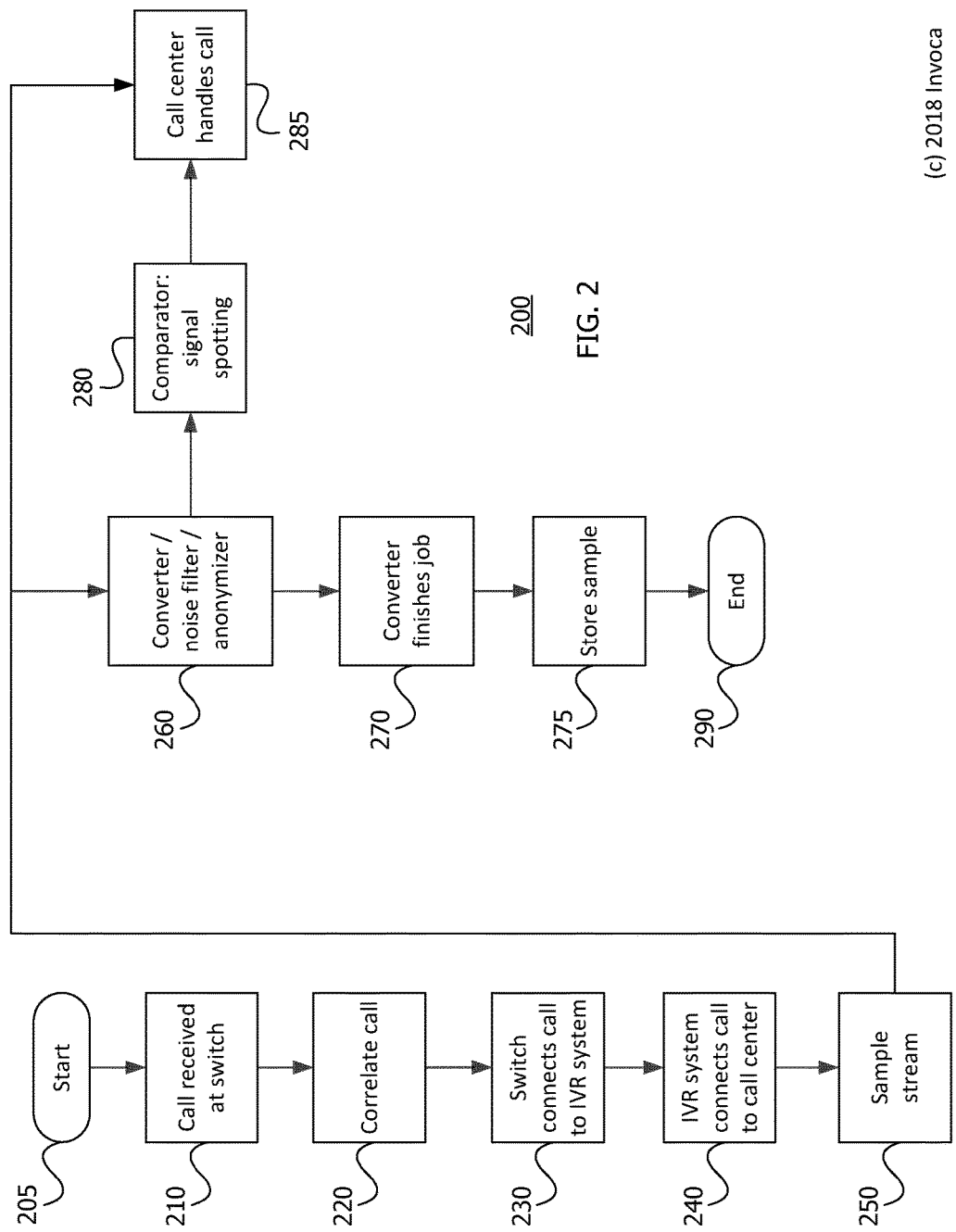
FIG. 2 is an operating environment/process for spotting desired signals in noisy, flawed environments.

Referring now to FIG. 2, an operating environment/process 200 for spotting desired signals in noisy, flawed environments. The process 200 may be or describe an environment in which the comparator 180 can be trained or used to spot desired signals. The process 200 starts at 205 and ends at 290, but the process can be cyclical in nature.

The process 200 may be performed during training of the comparator 180, such as described for FIG. 1. It may also be performed after such training, such as during use of the comparator 180. It may be performed by a marketing automation tool such as an expression builder unit or by the comparator 180. In this case, a call is received at 210, a converted sample is stored at 275 and the call is handled by an agent at 285. The call at 210 may be electronic waveform 120 for using the comparator 180. The converted sample at 275 may be the signal converted from electronic waveform 120; and any corresponding signals spotted at 280 may be one of the reference signals 135 and/or 145 used for training the comparator 180, such as described for FIG. 1.

For the process 200 performed during training of the comparator, the call at 210, signal at 275, signals spotted at 280 and/or actions of an agent at 285 may be predetermined training inputs, such as noted for FIG. 1. For the process 200 performed during use of the comparator, the call at 210 may be a live call from a customer prospect, the signal at 275 stored for later use, signals spotted at 280 may be identified desired signals and an agent at 285 may be a live agent or person talking to the customer prospect. In some cases, an agent at 280 may be an interactive voice response (IVR) system that is attending to the call.

After 205 where process 200 starts, the process continues to 210 where a call is received at a switch. The call may be a waveform of the signal source 110 and the switch may be the receiver antenna 115. Receiving the call at 210 may include or cause a call electronic waveform 120 to be input to the comparator 180. Receiving a signal at 210 may be similar to receiving a signal at the receiver antenna 115 of FIG. 1.

After 210, at 220 the call at 210 is correlated. Here, correlating may include correlating the caller identification or phone number that the call received at 210 originated from with a specific advertiser or marketing campaign. The specific advertiser or campaign may be one that the comparator 180 has been trained for.

Next, at 230 the switch (e.g., at 210) connect the call to an interactive voice response (IVR) system. Connecting at 230 may include creating an audio conversation between the caller of the call received and the IVR system. The conversation may be used to prompt the caller for information responses that identify a specific advertiser or marketing campaign that the comparator 180 has been trained for.

Then, at 240 the IVR system connects the received call (e.g., at 210) to a call center. Connecting at 240 may include creating an audio conversation between the caller of the call received and the appropriate call center as determined during the conversation at 230. For instance, at 240 the IVR system may identify a call center based on the specific advertiser or marketing campaign identified at 230 and then connect the received call to that call center.

After 240, at 250 a stream of the call (e.g., at 210) is sampled. This may include the call center or the comparator 180 sampling a stream of the audio or the electronic waveform 120 over a time period during which the waveform indicates behaviors, outcomes or intentions of the customer prospect. Thus, the sampled stream (or a conversion of that stream) may include one or more desired signals to be spotted. Sampling at 250 may sample a segment of or all of an audio conversation between the caller of the call received at 210 and the call center at 240, such as between the caller and an agent of the call center. The sampled stream may include caller responses to prompts from the call center or agent.

In some cases, the comparator 180 may reside in or be part of the call center. In others, the comparator is connected to the call center or independently connected to the call.

At 260 the sample stream of the call at 250 is converted by a converter. The converter may be converter unit that is part of the comparator 180. Converting at 260 may include transforming the original sample at 250 into a converted sample such as by noise filtering, transcribing and/or anonymizing the sample. Converting at 260 may occur during sampling at 250 such as during a call received at 210. Converting at 260 may create a written text transcription of the sample stream from 250 after noise filtering the audio signal or electronic waveform of that stream. The text may include a transcription of the audio conversation or electronic waveform of the conversation between the caller of the call received and the call center or agent noted at 250. At 260, the written transcription may then be anonymized to remove any indication of who the caller is or what number they called from. It may also remove any indication of who, what and/or where are the call center and/or agent. The converted sample may thus be a written text transcription of the original sample electronic waveform that is free of noise and any indication of who the caller is or what number called from. The converted sample may be or include the call information for the call being received at 210 or sampled at 250. The converted sample may include one or more desired signals to be spotted, such as in that existed in the sample stream from 250. Converting at 260 may create converted samples that include a product of a conversion of a respective original sample, and the converting can include filtering noise and transforming the original sample from an electronic waveform audio signal form to an electronic textual form (e.g., American Standard Code for Information Interchange—ASC II, or the like).

At 270, the converter at 260 finishes the job of converting of the sample at 260. Finishing at 270 may include completing transforming the original sample at 250 into the converted sample at 260.

At 275, the converted sample from 270 is stored. This may include the call center or the comparator 180 storing the written text transcription of the converted sample from 270 in a computer or other memory. This may also include storing the metadata and intonation of the completed converted sample of 270 with the transcribed sample. It may also include storing with the transcribed sample, the audio at 250 corresponding to the converted sample from 270. The converted sample may be or include the call information for the complete call received at 210 or sampled at 250.

The stored sample at 275 may be fed back into the comparator 180 during training or use of the comparator. It may also be used by an advertiser or the comparator 180 for analysis such as to create or correct the erroneous signals 130 or 140, respectively, such as noted for FIG. 1.

For some cases, the stored sample at 275 may be electronic waveform 120 or call information of that waveform that is input to the comparator 180 along with the reference signals 135 and/or 145 and the signal 155 to train the comparator for spotting desired signals in noisy, flawed environments. For example, the sample stored at 275 may be input as the electronic waveform 120 and/or conversion of electronic waveform 120, along with a corresponding machine created reference signal 145 that is used to for correcting the erroneous reference signals 130. This will be described further at FIG. 3.

At 280, the converted sample from 260 is input to the comparator 180 such as for the comparator 180 to spot one or more desired signals. At 280, the comparator 180 may spot one or more desired signals which indicate behaviors, outcomes or intentions of the customer prospect of the call. Spotting at 280 may include receiving the converted sample from 260 during sampling at 250 such as during a call received at 210. Spotting at 280 may include the comparator 180 receiving the call information (e.g., metadata, transcript and/or intonation) of the converted sample. Inputting the converted stream at 280 may include inputting the electronic waveform 120 or conversion of electronic waveform 120 as described for FIG. 1. Inputting at 280 and spotting by the comparator 180 may be further described at 285 below and with respect to FIG. 3.

At 285, signals spotted at 280 and the sampled stream from 250 are received by a call center which handles the call. This may include signals spotted at 280 being input to the call center to identify those signals in sampled stream during the call received at 210. For example, an indication of spotting of a desired signal at 280 may be sent to the call center or agent to indicate that spotting. The indication may be sent in a computer communicated message (e.g., text, email or otherwise) that directly identifies the desired signal or indicates an action to take as a result of spotting the signal.

For instance, an indication of spotting desired signal "want to buy" at 280 may be sent to a filter agent of the call center at 285. In response the filter agent may transfer the call to a closer agent of the call center to complete a purchase. In another case, an indication of spotting desired signal "want a refund" at 280 may be sent to a filter agent of the call center at 285. In response the filter agent may transfer the call to a customer service agent of the call center to review the possibility of a refund of a purchase. Before such transferring, the filter agent may discuss the transfer with the customer prospect.

For some cases, the stored sample at 275 may be used as the electronic waveform 120 or conversion of the electronic waveform 120 input to the comparator 180 along with the reference signals 135 and/or 145 and the signal 155 to train the comparator for spotting desired signals in noisy, flawed environments. For example, the sample stored at 275 may be input as the conversion of electronic waveform 120 along with a corresponding machine created reference signal 145 that is used to for correcting the erroneous reference signals 130. Using stored sample at 275 may be used as the electronic waveform 120 will be described further with respect to FIG. 3.

Figure 3:
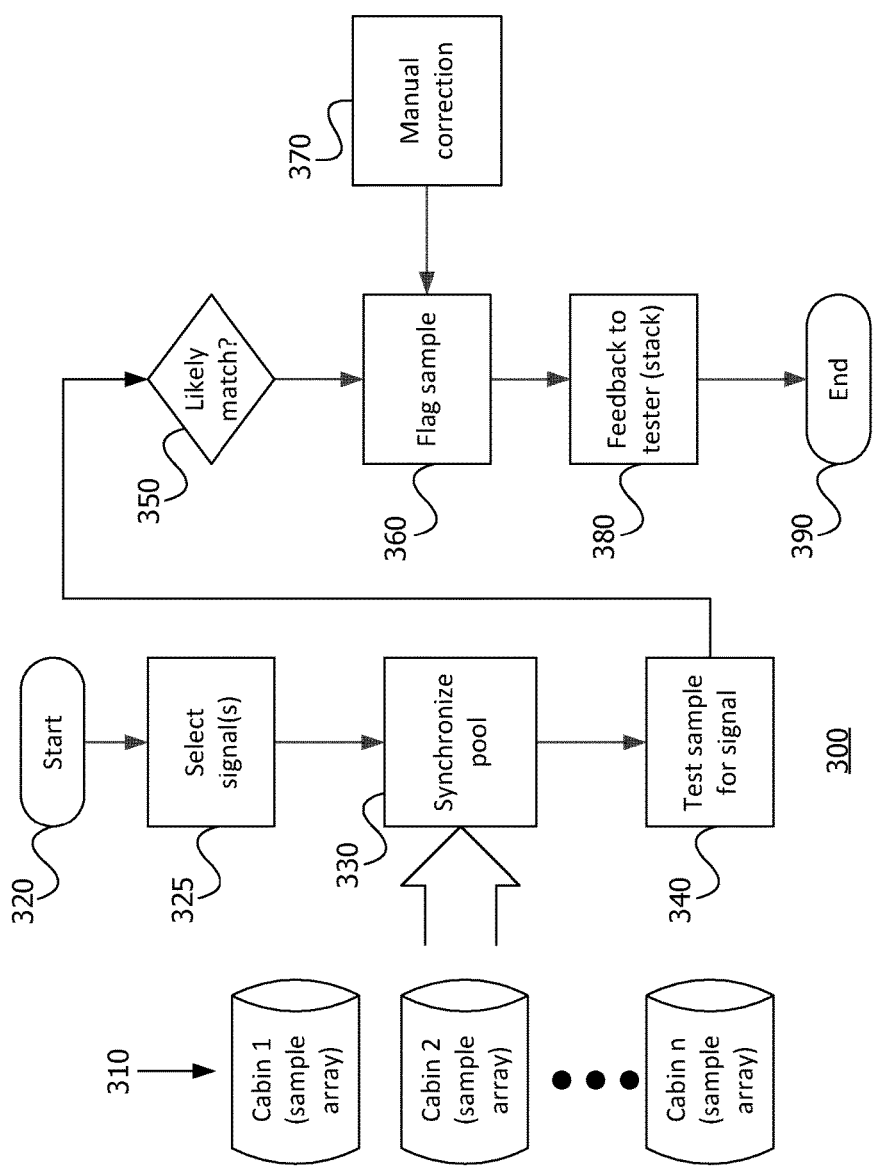
FIG. 3 is an operating environment/process for flagging a sample for spotting desired signals in noisy, flawed environments.

Referring now to FIG. 3, an operating environment/process for flagging a sample for spotting desired signals in noisy, flawed environments. The process 300 may be or describe an environment in which the comparator 180 can be trained or used to spot desired signals. The process 300 starts at 320 and ends 390, but the process can be cyclical in nature.

The process 300 may be performed during training of the comparator 180, such as described for FIG. 1. It may also be performed after such training, such as during use of the comparator 180. It may be performed by a marketing automation tool such as an expression builder unit or by the comparator 180. In this case, one or more signals that it is desired to spot (e.g., a desired signal(s)) are selected (e.g., identified) at 325, cabins of sample call arrays are received at 310, a sample is flagged at 360 and the flagged sample is feedback to a tester at 380.

For the process 300 performed during training of the comparator, the cabin inputs at 310, selected signal at 325, flagged sample at 360 and/or manual correction at 370 may be predetermined training inputs, such as noted for FIG. 1. For the process 200 performed during use of the comparator, the cabin inputs at 310 may represent or be a live call from a customer prospect, the selected signal at 325 may be one or more desired signals, the flagged sample at 360 and/or manual correction at 370 may be a spotted signal at 280 of FIG. 2.

At 325 one or more signals are selected to be spotted. This may include identifying the signals and identifying a target confidence level that a converted sample must have to be to be flagged. In some cases, the selected signals at 325 may be signals spotted in the electronic waveforms 120 and/or spotted at 280. The target confidence level may be the input signal 155 of FIG. 1.

At 310 one or more cabins or cabined arrays of sample arrays of calls are received or accessed. Each sample array at 310 may be a collection of various stored converted call samples from 275; and each cabin array may be a sample array for or from one of various advertisers or marketing campaigns, such as during training of the comparator 180. For example, each cabin array is a collection (sample array) of signals or electronic waveforms from one of multiple (1-n) different customers and the cabins 310 are cabin arrays 1-n, pooled together. Thus, when cabins 310 are used to training the comparator, they make it smarter by providing it with a greater number of various training input signals or waveforms from different customers to learn from.

During use of the comparator 180, the arrays at 310 may be arrays of the electronic waveforms 120, streams at 250 and/or samples at 275. For example, during use, cabins may represent one or more of the electronic waveforms 120 or conversion of electronic waveform 120 of live calls. In some cases, the calls of the arrays may be calls as noted for FIG. 1. Each signal or electronic waveform of cabined arrays at 310 may be derived for respective distinct environments, such as environments explained at FIG. 1 that may include distinctive noisy, flawed environments.

At 330 the cabin arrays (or waveforms or signals) from 310 are synchronized in a pool with the selected signals (and optionally target confidence levels) at 325 for testing to determine which if any include desired signals selected at 325 is or can be spotted in the cabin arrays from 310. Synchronizing may include pairing up each of the signals and confidence levels selected at 325 with all of the sample arrays of cabin arrays at 310 to determine which of the calls of the arrays has the selected signals, such as by spotting (e.g., testing at 340 and detecting at 350) the selected signals in ones of those calls.

Synchronizing at 330 may include synchronizing one of the desired signals from 325 to spot or detect in each of the calls at 330. It may also include passing to 340 that one desired signal and each of the calls at 330, one at a time for testing at 340.

At 340 the one call from 330 is tested to spot or detect the one desired signals from 330. Testing at 340 may include converting any electronic waveforms 120 of the arrays at 310 into a converted sample having call information of those electronic waveforms 120. This may be done as described at 260-270.

At 350 it is detected (e.g., decided) whether the test at 340 has a likely match between the one call (e.g., the converted sample or signal from the call) and the one desired signal at from 330. A likely match may be described as spotting or detecting that one desired signal in the one call at 350. Detecting at 350 may include measuring a confidence of the presence of the identified signal from 340 in the one converted sample from 340 using correlation of the identified signal to bodies of known matching samples. The known matching samples may be the reference signals 130 and/or 140; and the correlation may be part of the predictive modeling of the comparator or the model of the comparator. In some cases, the bodies of known matching samples may be derived from a combination of manually selected samples such as the samples selected to be the reference signals 130 (e.g., see at 180, 280 and/or 370) and/or samples selected by the comparator such as the samples selected to be the reference signals 140 (e.g., see at 180, 280 and/or 350-360).

For example, when training the comparator 180, detecting at 340 may include inputting a measured confidence of the presence of the identified signal from 340 in the one converted sample from 340 using correlation of the identified signal to inputted bodies of known matching samples. For example, here, the measured confidence, the identified signal from 340, the one converted sample from 340 and the inputted bodies of known matching samples may be training inputs to the comparator 180 (e.g., or the model of the comparator). Moreover, the training inputs may include whether the measured confidence for the given converted sample from 330 satisfies the target confidence level from 330 (e.g., selected at 325). If it satisfies, the given sample may be flagged at 360 as a likely match.

When using the comparator 180, detecting at 340 may include measuring a confidence of the presence of the identified signal from 340 in the one converted sample from 340 using correlation of the identified signal to bodies of known matching samples. The correlation may be a predictive modeling comparison and/or a weighting analysis comparison of the identified signal to bodies of known matching samples. For example, here, the identified signal from 340, the one converted sample from 340 and the bodies of known matching samples may be usage inputs to the comparator 180; and the measured confidence may be an output of the comparator 180. Here, if the measured confidence at 350 for a given converted sample from 330 satisfies the target confidence level from 330 (e.g., selected at 325) the given sample may be flagged at 360 as a likely match.

For example, testing at 340 and detecting at 350 may include passing a pool from 330 of cabined arrays from 310 through a comparator 180 to detect the identified signal from 325 or 330. It may include detecting the one desired signal in the one call from 340 for each of the calls in the pool at 330 by sequentially testing and detecting for the one desired signal in each of the calls in the pool.

At 360, if the measured confidence at 350 for a given converted sample from 330 satisfies the target confidence level from 330 (e.g., selected at 325) the given sample may be flagged. Flagging at 360 may be described as flagging a spotted or detected one desired signal in the one call at 350. In one case, and any flagged sample at 360 may be a spotting of a desired signal selected at 325 by the comparator 180 that occurs during training or use of the comparator. A flagged sample at 360 may be a spotted signal at 280 of FIG. 2

Flagging at 360 may include outputting flagged samples that include those desired signals. A flagged sample may be used as a machine created references signal 140 when comparator 180 automatically spots a desired signal without manual or user intervention (e.g., see 360 of FIG. 3). A flagged sample may be used as a manually created references signal 130 when the comparator 180 is manually corrected to spot a desired signal by manual input or user intervention (e.g., see 370 of FIG. 3).

At 370, if the flagging at 360 is inaccurate the flagging is manually corrected. Correcting at 370 can involve determining if the flagging at 360 and/or likely match at 350 accurate. This determining may include manually reviewing the training or usage inputs, and the determination at 350 for accuracy; and manually correcting the flagging when it is inaccurate, such as to correct erroneous flagging.

For example, correcting at 370 may be performed by a trainer of comparator 180, an administrator of the system 100 or a designer of the comparator 180. Flagging at 360 and/or correcting at 370 may be performed per advertiser or marketing campaign.

In some cases, correcting at 370 creates a hybrid reference signals that has hand marks for manual entry at 370 that are associated with a sample at 360 during training, to create a ground truth reference signals that makes the comparator smarter by providing it with a more accurate reference signal.

Making a manual correction at 370 may be correcting an erroneous reference signal 140 flagged at 360, such as by creating a manual reference signal 130 at 370 to replace the erroneous signal 140 and, thus correct for any possible mis-flagging of or misidentification of desired signals to be spotted. This erroneous signal 140 may be or be part of a noisy, flawed environment that is corrected for at 370.

However, it is also possible that making a manual correction at 370 may be creating an erroneous reference signal 130 and/or 135 to replace the reference signal 140 (regardless of whether signal 140 is erroneous) and, thus may cause a mis-flagging of or misidentification of desired signals to be spotted, such as by the comparator 180. The erroneous reference signal 130 may be or be part of a noisy, flawed environment that is corrected for as noted herein (e.g., see descriptions of FIG. 1). Consequently, the reference signal 140 or 145 can include call information allows the comparator 180 to perform weighting analysis that determines that the reference signal 130 or 135 is a mislabeled or suspicious reference signal. Notably, the effects of a manually created erroneous reference signal 130 currently created at 370, can be corrected for by a reference signal 140 previously or subsequently flagged at 360, such as using the comparator 180 and/or at 280.

At 380 the flagged sample from 360 or manually corrected sample from 370 are fed back to the tester at 340 and/or the determiner at 350. The sample may be added to the tester's stack of the references signals 130 or 140 as noted. Consequently, the flagged sample at 360 and/or manual correction at 370 may be used during training or use of the comparator 180 to correct for mis-flagging of or misidentification of desired signals to be spotted in the electronic waveform 120 or pool 330. For example, the flagged sample at 360 and/or manual correction at 370 may be a machine created reference signal 140 and/or a machine created reference signal 130, respectively, that are used during training or use of the comparator 180 to for spotting desired signals in noisy, flawed environments. In some cases, testing at 340 through feeding back at 380 may be repeated for all calls of a pool at 330. They may also be repeated for every desired signal to be spotted in every pool at 330.

Figure 4:
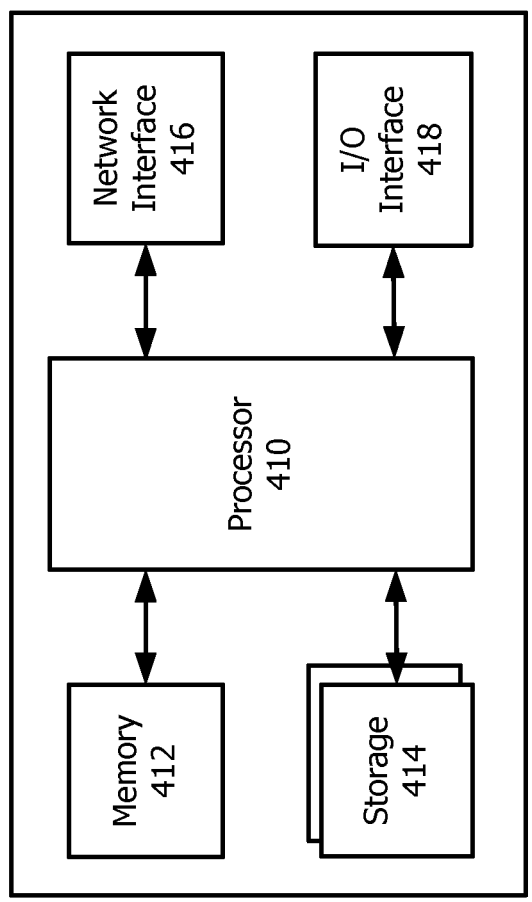
FIG. 4 is a block diagram of a computing device.

FIG. 4 is a block diagram of a computing device 400. The computing device 400 may be representative of the system 100 and/or the comparator 108, herein. The computing device 400 may be a desktop or laptop computer, a server computer, a tablet, a smartphone or other mobile device. The computing device 400 may include software and/or hardware for providing functionality and features described herein. The computing device 400 may therefore include one or more of: logic arrays, memories, analog circuits, digital circuits, software, firmware and processors. The hardware and firmware components of the computing device 400 may include various specialized units, circuits, software and interfaces for providing the functionality and features described herein. For example, a global positioning system (GPS) receiver or similar hardware may provide location-based services.

The computing device 400 has a processor 410 coupled to a memory 412, storage 414, a network interface 416 and an I/O interface 418. The processor 410 may be or include one or more microprocessors, field programmable gate arrays (FPGAs), application specific integrated circuits (ASICs), programmable logic devices (PLDs) and programmable logic arrays (PLAs).

The memory 412 may be or include RAM, ROM, DRAM, SRAM and MRAM, and may include firmware, such as static data or fixed instructions, BIOS, system functions, configuration data, and other routines used during the operation of the computing device 400 and processor 410. The memory 412 also provides a storage area for data and instructions associated with applications and data handled by the processor 410. As used herein the term "memory" corresponds to the memory 412 and explicitly excludes transitory media such as signals or waveforms.

The storage 414 provides non-volatile, bulk or long-term storage of data or instructions in the computing device 400. The storage 414 may take the form of a magnetic or solid state disk, tape, CD, DVD, or other reasonably high capacity addressable or serial storage medium. Multiple storage devices may be provided or available to the computing device 400. Some of these storage devices may be external to the computing device 400, such as network storage or cloud-based storage. As used herein, the terms "storage" and "storage medium" correspond to the storage 414 and explicitly exclude transitory media such as signals or waveforms. In some cases, such as those involving solid state memory devices, the memory 412 and storage 414 may be a single device.

The network interface 416 includes an interface to a network such as a network that can be used to communicate calls, signals, streams, arrays, flagged samples and feedback described herein. The network interface 416 may be wired or wireless.

The I/O interface 418 interfaces the processor 410 to peripherals (not shown) such as displays, video and still cameras, microphones, keyboards and USB devices.

In some cases, storage 414 is a non-volatile machine-readable storage medium that includes all types of computer readable media, including magnetic storage media, optical storage media, and solid state storage media. It should be understood that the software can be installed in and sold with the system 100 and/or the comparator 108. Alternatively the software can be obtained and loaded into the system 100 and/or the comparator 108, including obtaining the software via a disc medium or from any manner of network or distribution system, including from a server owned by the software creator or from a server not owned but used by the software creator. The software can be stored on a server for distribution over the Internet.

Some technologies described for the system 100, the comparator 180 and/or the computing device 400 may include numerous units including a first identifier unit to identify a signal to be spotted; a second identifier unit to identify a target confidence level; a synchronizer unit coupled to the first and second identifying units to synchronize a pool of cabined arrays of call samples with the identified signal and the identified confidence level; and/or a tester unit coupled to the synchronizer to pass the pool of cabined arrays of calls samples through a comparator unit 180; where the comparator unit is configured to detect the identified signal, wherein the cabined arrays are derived from respective distinct environments, the arrays comprising plural converted samples, and wherein detecting comprises measuring a confidence of the presence of the identified signal in each of plural converted samples using correlation of the identified signal to bodies of known matching samples. They may also include a flagger unit to flag a given converted sample if the confidence for the given converted sample satisfies the target confidence level; wherein each converted sample comprises a product of a conversion of a respective original sample, the conversion including filtering noise and transforming the original sample from a first form to a second form. In some cases, they include a deriver unit to derive the bodies of known matching samples from a combination of manually selected samples and samples selected by the comparator; a feedback loop unit to feed back into the comparator corrections of mis-flagging; and/or an anonymizer unit to anonymize the converted sample. The first and second identifying units may further have a user input device. In some cases, the comparator unit may further have a predictive model for performing a weighting analysis comparison of the identified signal to bodies of known matching samples.

Some technologies described for the system 100, the comparator 180 and/or the computing device 400 may include numerous units including a measurer to measure a confidence of the presence of the desired signal in each of plural converted samples using correlation of the desired signal to bodies of known matching samples; and a flagger coupled to the measurer to flag a given converted sample if the confidence for the given converted sample satisfies a target confidence level; wherein each converted sample comprises a product of a conversion of a respective original sample, the conversion including filtering noise and transforming the original sample from a first form to a second form. They may also include a first identifier unit to identify the desired signal to be spotted; and a second identifier unit to identify the target confidence level. They may further include a synchronizer coupled to the first and second identifying units to synchronize a pool of cabined arrays of call samples with the desired signal and the identified confidence level, wherein the cabined arrays are derived from respective distinct environments, the arrays comprising plural converted samples. In some cases, they include a tester coupled to the synchronizer to pass the pool of cabined arrays of calls samples through the measurer. In some cases, the comparator unit may further have a predictive model for performing a weighting analysis comparison of the identified signal to bodies of known matching samples.

The comparator may be or include a classifier or classifier unit which has a predictive data model or a scoring model.

The technologies described herein provide various technological improvements to computer performance and efficiently. For example, the system 100, the comparator 180, the process 200, the process 300 and/or the computing device 400 provide a much more accurate and efficient device (and process) for spotting desired signals by being able to spot desired signals noisy, flawed environments. For example, the technologies described are technological improvements over those of the past because they can accurately spot desired signals in noisy, flawed environments by: spotting the signals when there is audio noise in the input signal or call; correcting for erroneous manually created reference signals; and/or correcting for erroneous machine created reference signals. Prior technologies do have such improvements.

More particularly, the technologies described allow one of the most important steps in the path to purchase, call conversations to be a potential goldmine of information for advertisers and marketers without the time consuming and resource-intensive need to manually listen to calls. For example, using the technologies described allow desired signals or keywords spotting to be set up and maintained during today's rapidly evolving consumer behavior. This means all of the rich insights from the voice conversation of a call can be determined and maintained by using the technologies described to analyze live phone conversations and understand caller (e.g., customer prospect) intent and outcomes based on spotting desired signals in the calls. As these caller data points and outcomes are identified, a desired signal can automatically trigger or provide real-time conversion and optimization data (e.g., see handling the call at 285). In addition, advertisers or marketers can utilize these insights to make smarter decisions on everything from pay per click bidding strategy to digital retargeting audiences.

Specifically, the technologies described allow advertisers or marketers to identify desired caller behavior, outcome or intention parts of a call (e.g., a call or sample at 120, 180, 280, 275 and 310) which they want to spot with desired signals. In one case, they may want to spot parts of the call that identify a customer prospect call, a quote inquiry, an application completion, a claim filing or a policy purchase. Based on the parts they identify, the technologies described can train comparator 180 using prior or current calls (e.g., a call or sample at 120, 180, 280, 275 and 310) to understand caller intent or the desired signals for spotting (e.g., see spotting and samples at 180, 280 and 350-380). Based on the spotting, the technologies described can be trained to properly respond to the caller accordingly (e.g., see at 180, 240, 280, 285 and 380), such as with " . . . I need your home address . . . ", " . . . know the price for insurance . . . ", " . . . like to get a quote . . . .". Thus, the technologies described can be used during or applied against new calls to automatically spot the desired signals and automatically, properly respond (e.g., see at 180, 240, 280 and 285).

Within this description, the term "engine" means a collection of hardware, which may be augmented by firmware and/or software, that performs the described functions. An engine may typically be designed using a hardware description language (HDL) that defines the engine primarily in functional terms. The HDL design may be verified using an HDL simulation tool. The verified HDL design may then be converted into a gate netlist or other physical description of the engine in a process commonly termed "synthesis". The synthesis may be performed automatically using a synthesis tool. The gate netlist or other physical description may be further converted into programming code for implementing the engine in a programmable device such as a field programmable gate array (FPGA), a programmable logic devices (PLD), or a programmable logic arrays (PLA). The gate netlist or other physical description may be converted into process instructions and masks for fabricating the engine within an application specific integrated circuit (ASIC).

Within this description, the term "unit" also means a collection of hardware, firmware, and/or software, which may be on a larger scale than an "engine". For example, a unit may contain multiple engines, some of which may perform similar functions in parallel. The terms "engine" and "unit" do not imply any physical separation or demarcation. All or portions of one or more units and/or engines may be collocated on a common card, such as a network card 114, or within a common FPGA, ASIC, or other circuit device.

Although shown implemented in a personal computer, the processes and apparatus may be implemented with any computing device. A computing device as used herein refers to any device with a processor, memory and a storage device that may execute instructions including, but not limited to, personal computers, server computers, computing tablets, set top boxes, video game systems, personal video recorders, telephones, personal digital assistants (PDAs), portable computers, and laptop computers. These computing devices may run an operating system, including variations of the Linux, Microsoft Windows, Symbian, and Apple Mac operating systems.

The techniques may be implemented with machine readable storage media in a storage device included with or otherwise coupled or attached to a computing device. That is, the software may be stored in electronic, machine readable media. These storage media include magnetic media such as hard disks, optical media such as compact disks (CD-ROM and CD-RW) and digital versatile disks (DVD and DVD±RW); flash memory cards; and other storage media. As used herein, a storage device is a device that allows for reading and/or writing to a storage medium. Storage devices include hard disk drives, DVD drives, flash memory devices, and others.

By data unit, it is meant a frame, cell, datagram, packet or other unit of information.

The comparator device 180 may include a comparator unit and/or a model unit. These units may be hardware, software, firmware, or a combination thereof. Additional and fewer units, modules or other arrangement of software, hardware and data structures may be used to achieve the processes and apparatuses described herein.

Closing Comments

Throughout this description, the technologies described and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one technology are not intended to be excluded from a similar role in other technologies.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method of desired signal spotting in noisy, flawed environments comprising:
    identifying a signal to be spotted;
    identifying a target confidence level;
    passing a pool of cabined arrays through a comparator to detect the identified signal, wherein the cabined arrays are derived from respective distinct environments, the arrays comprising plural converted samples, and wherein detecting comprises measuring a confidence of a presence of the identified signal in each of plural converted samples using correlation of the identified signal to bodies of known matching samples;
    if the confidence for a given converted sample satisfies the target confidence level, flagging the given sample; and
    the comparator receiving manual inputs that are feeding back corrections of mis-flagging by manually inputting text corrected per an advertiser or a marketing campaign as a corrected flagging for the given converted sample that is mis-flagged;
    wherein each converted sample comprises a product of a conversion of a respective original sample, the conversion including filtering noise and transforming the original sample from a first form to a second form.

2. The method of claim 1 wherein the bodies of known matching samples are derived from a combination of manually selected samples and samples selected by the comparator.

3. The method of claim 1 wherein the conversion further includes anonymization.

4. The method of claim 1 wherein:
    the respective distinctive environments comprise electronic waveforms of the respective original samples;
    the noisy, flawed environments comprise at least one of noise in a call signal of the pool of cabined arrays or an erroneous sample of the bodies of known matching samples;
    the signal to be spotted comprises one or more spoken terms; and the first form is an audio electronic waveform and the second form is text.

5. The method of claim 1 further comprising:
pooling plural cabined arrays derived from the distinct environments with the identified signal to be spotted, the arrays comprising plural call samples; and
converting each respective original sample to a converted sample.

6. An apparatus for desired signal spotting in noisy, flawed environments comprising:
a first identifier unit to identify a signal to be spotted;
a second identifier unit to identify a target confidence level;
a synchronizer coupled to the first and second identifying units to synchronize a pool of cabined arrays of call samples with the identified signal and the identified confidence level; and
a tester coupled to the synchronizer to pass the pool of cabined arrays of calls samples through a comparator;
the comparator to detect the identified signal, wherein the cabined arrays are derived from respective distinct environments, the arrays comprising plural converted samples, and wherein detecting comprises measuring a confidence of a presence of the identified signal in each of plural converted samples using correlation of the identified signal to bodies of known matching samples;
a flagger to flag a given converted sample if the confidence for the given converted sample satisfies the target confidence level; and
a feedback loop to feed back into the comparator manual inputs that are corrections of mis-flagging having manually inputted text corrected per an advertiser or a marketing campaign as a corrected flagging for the given converted sample that is mis-flagged;
wherein each converted sample comprises a product of a conversion of a respective original sample, the conversion including filtering noise and transforming the original sample from a first form to a second form.

7. The apparatus of claim 6 further comprising a deriver to derive the bodies of known matching samples from a combination of manually selected samples and samples selected by the comparator.

8. The apparatus of claim 6 further comprising an anonymizer to anonymize the converted sample.

9. The apparatus of claim 6 wherein the first and second identifying units further comprise a user input device; and
wherein the comparator further comprises a predictive model for performing a weighting analysis comparison of the identified signal to bodies of known matching samples.

10. A comparator to detect desired signals in noisy, flawed environments comprising:
a measurer to measure a confidence of a presence of the desired signal in each of plural converted samples using correlation of the desired signal to bodies of known matching samples;
a flagger coupled to the measurer to flag a given converted sample if the confidence for the given converted sample satisfies a target confidence level; and
a feedback loop to feed back into the comparator manual inputs that are corrections of mis-flagging having manually inputted text corrected per an advertiser or a marketing campaign as a corrected flagging for the given converted sample that is mis-flagged;
wherein each converted sample comprises a product of a conversion of a respective original sample, the conversion including filtering noise and transforming the original sample from a first form to a second form.

11. The comparator of claim 10 further comprising:
a first identifier unit to identify the desired signal to be spotted;
a second identifier unit to identify the target confidence level;
a synchronizer coupled to the first and second identifying units to synchronize a pool of cabined arrays of call samples with the desired signal and the identified confidence level, wherein the cabined arrays are derived from respective distinct environments, the arrays comprising plural converted samples; and
a tester coupled to the synchronizer to pass the pool of cabined arrays of calls samples through the measurer.

12. The comparator of claim 10 further comprising a deriver to derive the bodies of known matching samples from a combination of manually selected samples and samples selected by the comparator.

13. The comparator of claim 10 further comprising an anonymizer to anonymize the converted sample.

14. The comparator of claim 10 wherein the first and second identifying units further comprise a user input device; and
wherein the comparator further comprises a predictive model for performing a weighting analysis comparison of the identified signal to bodies of known matching samples.

\* \* \* \* \*